(12) United States Patent
Vassilovski et al.

(10) Patent No.: US 11,145,193 B2
(45) Date of Patent: Oct. 12, 2021

(54) INTERSECTION TRAJECTORY DETERMINATION AND MESSAGING

(71) Applicant: QUALCOMM Incorporated, San Diego, CA (US)

(72) Inventors: Dan Vassilovski, Del Mar, CA (US); Zhibin Wu, Los Altos, CA (US); Hong Cheng, Bridgewater, NJ (US)

(73) Assignee: QUALCOM Incorporated, San Diego, CA (US)

( * ) Notice: Subject to any disclaimer, the term of this patent is extended or adjusted under 35 U.S.C. 154(b) by 62 days.

(21) Appl. No.: 16/723,719

(22) Filed: Dec. 20, 2019

(65) Prior Publication Data

US 2021/0192939 A1 Jun. 24, 2021

(51) Int. Cl.
*G08G 1/01* (2006.01)
*B60W 40/06* (2012.01)
*B60W 40/12* (2012.01)
*G08G 1/0967* (2006.01)

(52) U.S. Cl.
CPC .......... *G08G 1/0112* (2013.01); *B60W 40/06* (2013.01); *B60W 40/12* (2013.01); *G08G 1/0116* (2013.01); *G08G 1/0137* (2013.01); *G08G 1/096708* (2013.01); *G08G 1/096791* (2013.01); *B60W 2556/45* (2020.02)

(58) Field of Classification Search
CPC .. G08G 1/0112; G08G 1/0116; G08G 1/0137; G08G 1/096708; G08G 1/096791; B60W 40/06; B60W 40/12; B60W 2556/45
See application file for complete search history.

(56) References Cited

U.S. PATENT DOCUMENTS

| | | | |
|---|---|---|---|
| 10,479,373 B2 | 11/2019 | Mudalige et al. | |
| 10,926,777 B2* | 2/2021 | McGill | B60W 50/14 |
| 2013/0304279 A1 | 11/2013 | Mudalige et al. | |
| 2016/0161271 A1* | 6/2016 | Okumura | G01C 21/34 |
| | | | 701/25 |
| 2019/0318620 A1 | 10/2019 | Yang et al. | |
| 2020/0026283 A1* | 1/2020 | Barnes | G05D 1/0088 |
| 2020/0234582 A1* | 7/2020 | Mintz | G08G 1/0968 |

(Continued)

OTHER PUBLICATIONS

Chen L., et al., "Cooperative Intersection Management: A Survey", IEEE Transactions on Intelligent Transportation Systems, IEEE, Piscataway, NJ, USA, vol. 17, No. 2, Feb. 1, 2016 (Feb. 1, 2016), pp. 570-586, XP011597405, ISSN: 1524-9050, DOI:10.1109/TITS. 2015.2471812, [retrieved on Jan. 29, 2016], p. 570-p. 579.

(Continued)

*Primary Examiner* — Hussein Elchanti
(74) *Attorney, Agent, or Firm* — Weaver Austin Villeneuve & Sampson LLP

(57) ABSTRACT

Techniques are disclosed for a priori or real-time intersection trajectory determination of a vehicle, and corresponding messaging of the trajectory determination. Trajectory determination may be based on vehicle static characteristics, dynamic characteristics, and/or intersection geometry. Trajectory messages, which can be communicated using CV2X, may not only indicate the trajectory, but may (optionally) indicate which intersection ingress and egress points the vehicle will block over the course of the traversal of the vehicle along the trajectory.

27 Claims, 11 Drawing Sheets

(56) References Cited

U.S. PATENT DOCUMENTS

2020/0250473 A1* 8/2020 Elluswamy .......... G06K 9/6255
2020/0272159 A1* 8/2020 Zhang ............. B60W 30/18159
2021/0009154 A1* 1/2021 Wray ..................... G08G 1/163

OTHER PUBLICATIONS

International Search Report and Written Opinion—PCT/US2020/065029—ISA/EPO—dated Apr. 8, 2021.

* cited by examiner

INTERSECTION TRAJECTORY DETERMINATION AND MESSAGING

BACKGROUND

For autonomous and semi-autonomous vehicles, vehicle maneuver planning and path planning are dictated by the vehicle environment. This environment includes surrounding features such as vehicles, objects, and obstacles. Cellular vehicle-to-everything (CV2X) is a communication standard for exchanging information regarding a vehicle's environment. CV2X can include communication between CV2X-capable vehicles, and between CV2X-capable vehicles and other CV2X-capable entities, such infrastructure-based devices (commonly-termed road-side units (RSUs)), pedestrians, cyclists or other road users. CV2X can use cellular-based communication such as long-term evolution (LTE), fifth generation (5G), and/or other cellular technologies in a direct-communication mode as defined by the 3rd Generation Partnership Project (3GPP).

Traffic messaging technologies such as CV2X could be particularly useful for the management of traffic intersections, with respect to both autonomous and non-autonomous vehicles. For example, the with such management, a vehicle could pass through intersections without stopping or with reduced delay, thus reducing transit time and fuel consumption. Problematically, current solutions for intersection-management messaging would be ineffective in providing the information needed for effective intersection management, especially for more complicated intersections.

BRIEF SUMMARY

Techniques described herein address these and other issues by providing for a priori or real-time intersection trajectory determination of a vehicle, and corresponding messaging of the trajectory determination. Trajectory determination may be based on vehicle static characteristics, dynamic characteristics, and/or intersection geometry.

Trajectory messages, which can be communicated using CV2X, may not only indicate the trajectory, but may (optionally) indicate which intersection ingress and egress points the vehicle will block over the course of the traversal of the vehicle along the trajectory.

An example method of communicating information for traversal of a vehicle through a traffic intersection, according to the description, comprises obtaining information regarding a geometry of the intersection, determining a proposed path of the vehicle through the intersection, from a predetermined one of one or more ingress points of the intersection to a predetermined one of one or more egress points of the intersection, based at least in part on one or more characteristics of the vehicle, the geometry of the intersection, the one or more ingress points, and the one or more egress points. The method further comprises wirelessly transmitting a message indicative of the proposed path.

An example device for communicating information for traversal of a vehicle through a traffic intersection, according to the description, comprises a wireless communication interface, a memory, and one or more processing units communicatively coupled to the memory and the wireless communication interface. The one or more processing units are configured to obtain information regarding a geometry of the intersection, determine a proposed path of the vehicle through the intersection, from a predetermined one of one or more ingress points of the intersection to a predetermined one of one or more egress points of the intersection, based at least in part on one or more characteristics of the vehicle, the geometry of the intersection, the one or more ingress points, and the one or more egress points. The one or more processing units are further configured to wirelessly transmit, via the wireless communication interface, a message indicative of the proposed path.

An example device, according to the description, comprises means for obtaining information regarding a geometry of the intersection, means for determining a proposed path of a vehicle through a traffic intersection, from a predetermined one of one or more ingress points of the intersection to a predetermined one of one or more egress points of the intersection, based at least in part on one or more characteristics of the vehicle, the geometry of the intersection, the one or more ingress points, and the one or more egress points. The example device further comprises means for wirelessly transmitting a message indicative of the proposed path.

An example non-transitory, computer-readable medium, according to the description, has instructions stored thereby for communicating information for traversal of a vehicle through a traffic intersection. The instructions, when executed by one or more processing units, cause the one or more processing units to obtain information regarding the geometry of the intersection, determine a proposed path of the vehicle through the intersection, from a predetermined one of one or more ingress points of the intersection to a predetermined one of one or more egress points of the intersection, based at least in part on one or more characteristics of the vehicle, the geometry of the intersection, the one or more ingress points, and the one or more egress points. The instructions, when executed by the one or more processing units, further cause the one or more processing units to wirelessly transmit a message indicative of the proposed path.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110-A, 110-B, 110-C, etc. When referring to such an element using only the first number, any instance of the element is to be understood (e.g., element 110 in the previous example would refer to elements 110-1, 110-2, and 110-3 or to elements 110-A, 110-B, and 110-C).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

As previously noted, intersection management using CV2X or similar messaging could provide significant benefits, but current proposals for intersection-management messaging fail to provide an effective solution to real-world scenarios. For example, proposals may utilize existing messaging as defined by standards organizations, such as the Society of Automotive Engineers (SAE) or European Telecommunications Standards Institute Intelligent Transport Systems (ETSI), to grant access to a vehicle to traverse through an intersection. But this can be an ineffective solution, because multiple vehicles may be capable of traversing multiple paths through an intersection. More advanced solutions suggest discretizing intersections into blocks that are observable on a time basis. But even these solutions fall short of providing sufficient information for effective intersection management for to account for different vehicle types—especially for complicated intersections (e.g., having irregular shapes). Embodiments provided herein for communicating information for traversal of a vehicle through a traffic intersection address these and other issues.

It is noted that, although only certain types of intersections are illustrated in the embodiments herein, the disclosed techniques are applicable to intersections of all types. Further, as referred to herein, ingress and egress "points" of an intersection are locations at which vehicles may enter and exit the intersection, respectively. Additionally, as used herein, the term "traffic entity" is used to refer to vehicles, RSUs, or other systems (e.g., computer servers or the like) used to communicate information (e.g., using CV2X messaging) for traffic management.

Figure 1B:
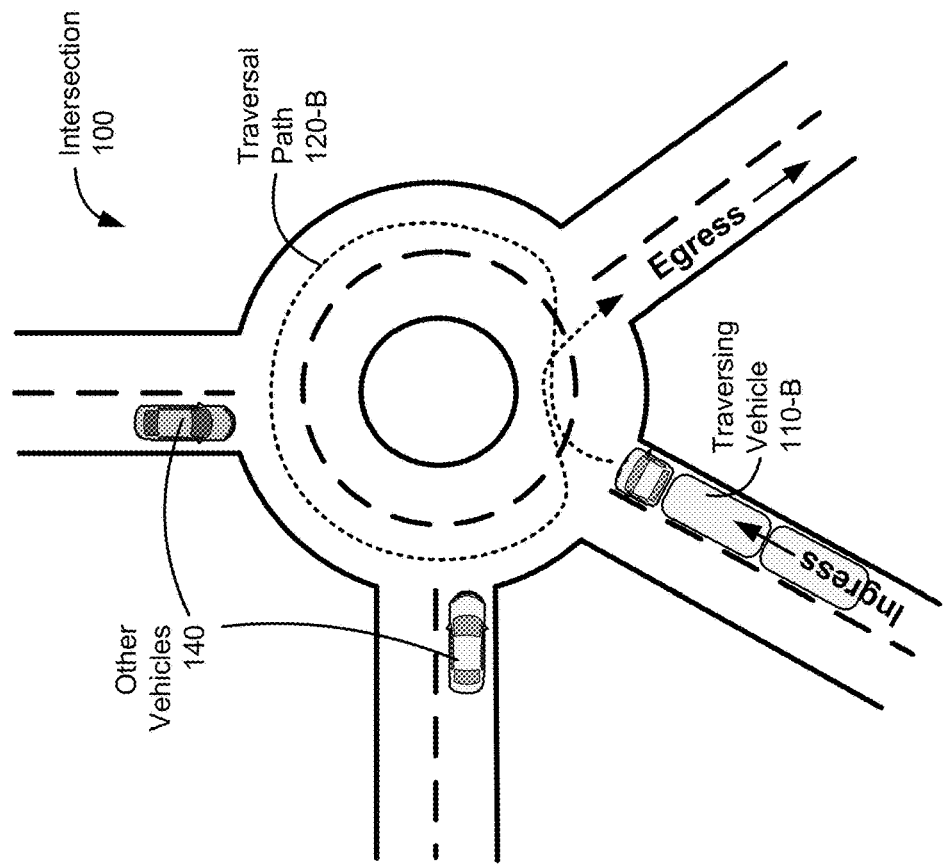
FIGS. 1A, 1B, 2A, and 2B are overhead views of vehicle traversal paths through a first type of intersection.
Figure 1A:
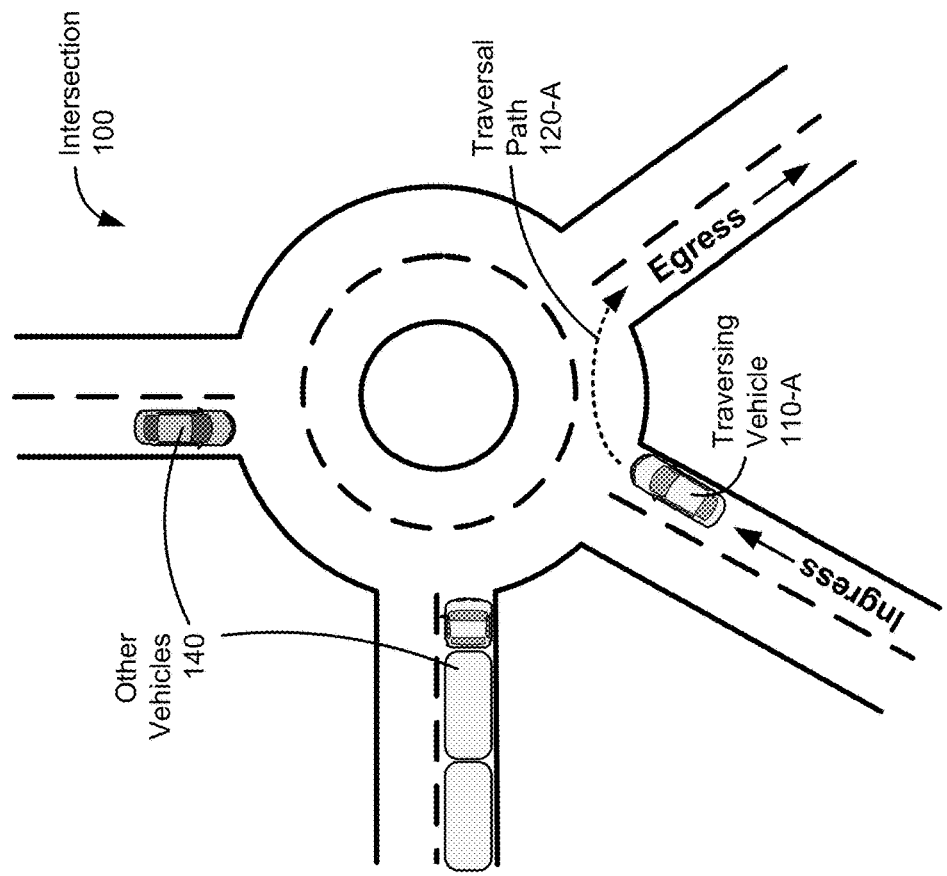

FIGS. 1A and 1B are overhead views of an intersection 100, illustrating how traversing vehicles (110-A and 110-B, collectively and generically referred to herein as traversing vehicles 110) may navigate the intersection 100 differently (by traveling along different respective traversal paths 120), thereby impacting traffic at the intersection 100 differently. In the example illustrated in FIGS. 1A and 1B, the intersection 100 comprises a roundabout (or rotary) with various points of ingress and egress.

In FIG. 1A, a first traversing vehicle 110-A comprises a car traveling from a point of ingress to a point of egress along a first traversal path 120-A. Because the first traversing vehicle 110-A is relatively small and maneuverable, it can navigate the first traversal path 120-A without blocking access to the intersection 100 by other vehicles 140 at other points of ingress.

In contrast, the second traversing vehicle 110-B shown in FIG. 1B has a much different impact on the intersection 100. Although traversing from the same ingress and egress points as the first traversing vehicle 110-A, the second traversing vehicle 110-B comprises a much larger, articulated vehicle (e.g., a semi-trailer truck with multiple semi-trailers.) It therefore takes a much different traversal path 120-B than the first traversing vehicle 110-A. As can be seen, the traversal path 120-B of the second traversing vehicle 110-B can end up blocking access to the intersection 100 for other vehicles 140.

Figure 2B:
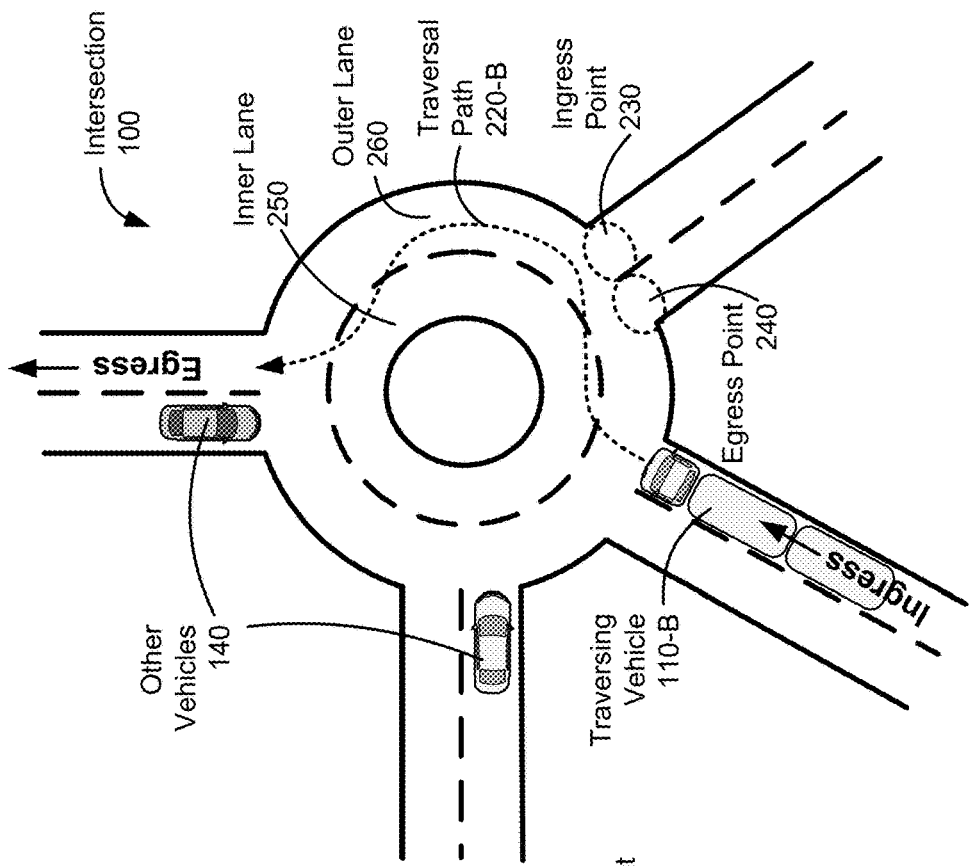
Figure 2A:
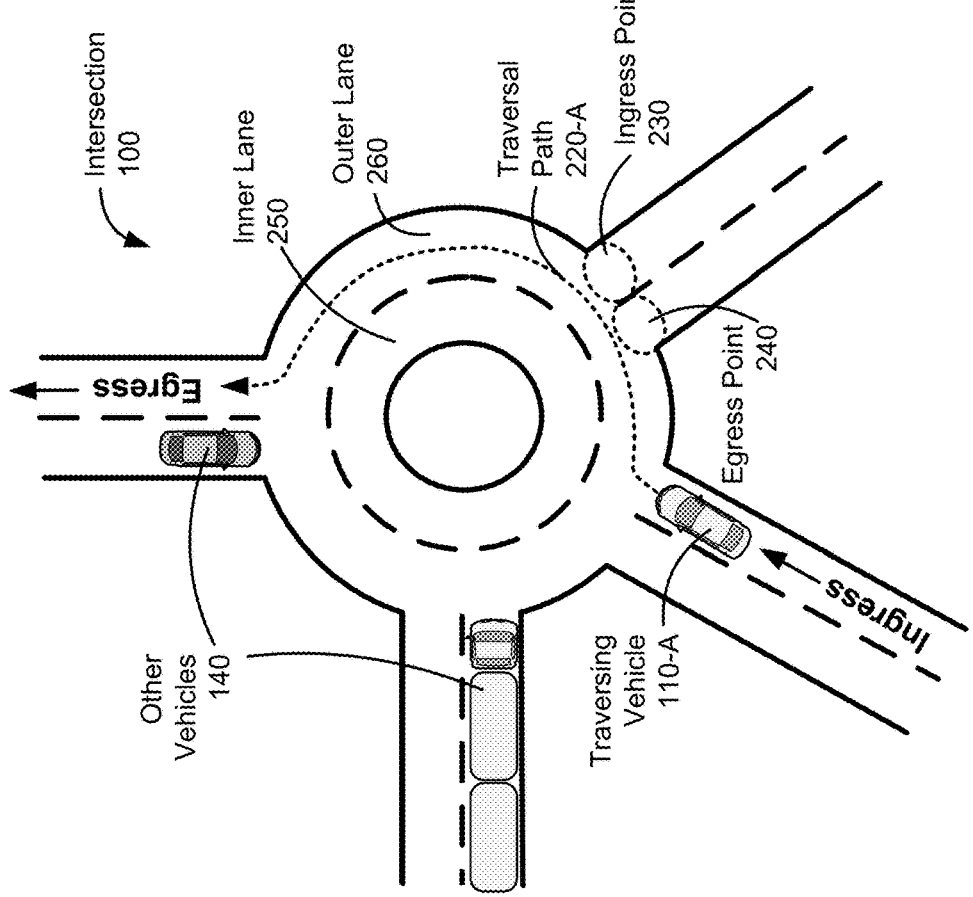

FIGS. 2A and 2B are overhead views of the intersection 100 and first and second traversing vehicles 110, similar to the examples shown in FIGS. 1A and 1B. Here, however, ingress and egress points are different, showing how lanes within the intersection 100 can be affected by the traversal of the traversing vehicles 110 through the intersection 100.

In FIG. 2A, the first traversing vehicle 110-A (again, a relatively small and maneuverable car) is able to traverse through the intersection 100 along a first traversal path 220-A without blocking access to the intersection 100 for other vehicles 140. Because of the size and maneuverability of the first traversing vehicle 110-A, the traversal path 220-A is strictly in the outer lane 260 of the intersection 100, leaving the inner lane 250 unblocked and thereby potentially accessible to other vehicles 140.

However, while traveling along the first traversal path 220-A, the first traversing vehicle 110-A blocks ingress point 230 and egress point 240 of the intersection 100. Thus, at certain times while the first traversing vehicle maneuvers through the intersection 100 along the first traversal path 220-A, the egress points 240 will be inaccessible to the other vehicles 140, and the ingress point 230 will be blocked to any vehicles approaching the ingress points 230.

In FIG. 2B, the second traversal path 220-B of the second traversing vehicle 110-B requires additional considerations. Not only does the second traversal path 220-B block egress point 240 and ingress points 230 in a manner similar to the first traversal path 220-A, it also blocks portions of the inner lane 250. It can be further noted that, due to the size, speed, and other characteristics of the second traversing vehicle 110-B, it may block egress point 240 and ingress point 230 for longer periods of time relative to the first traversing vehicle 110-A.

Figure 3B:
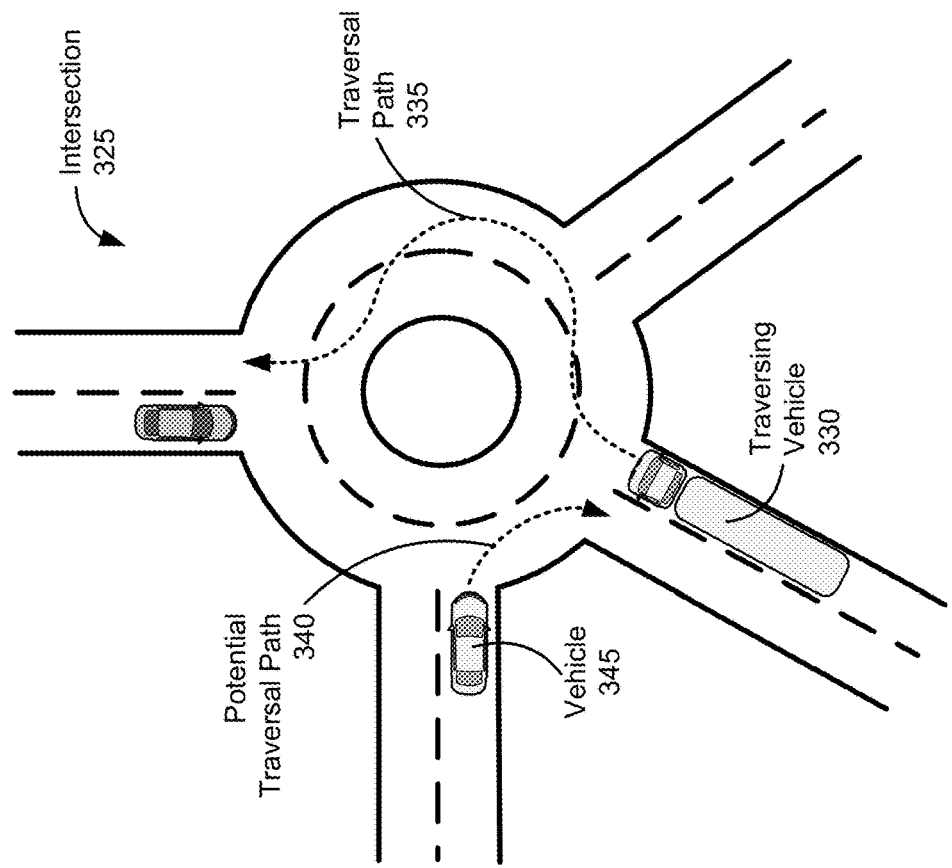
FIGS. 3A-3C are overhead views of vehicle traversal paths through different types of intersections.
Figure 3A:
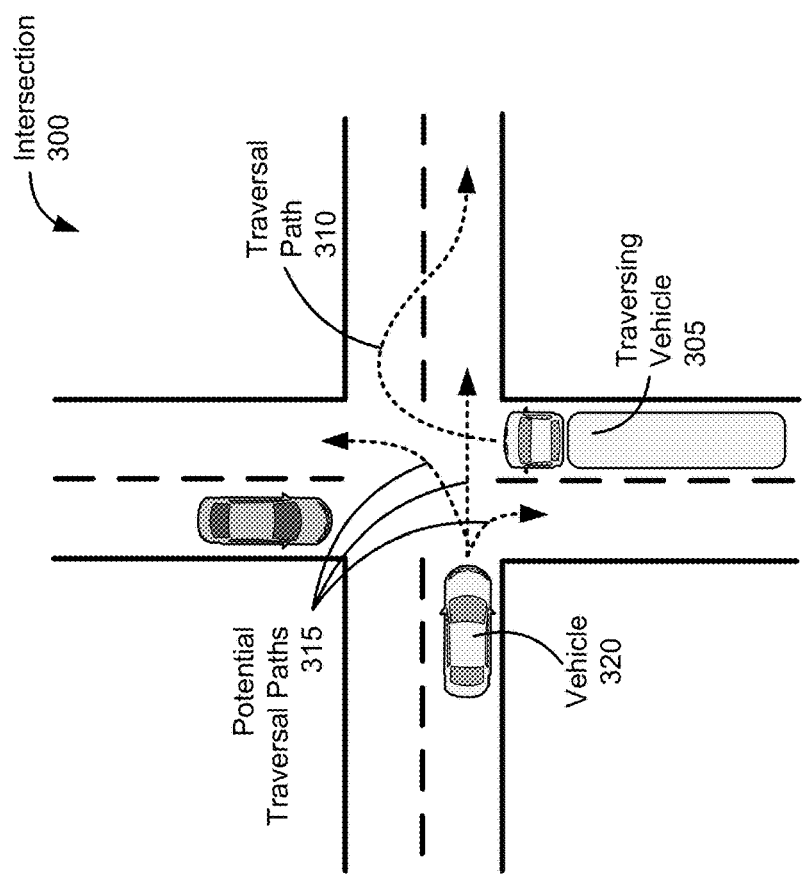
Figure 3C:
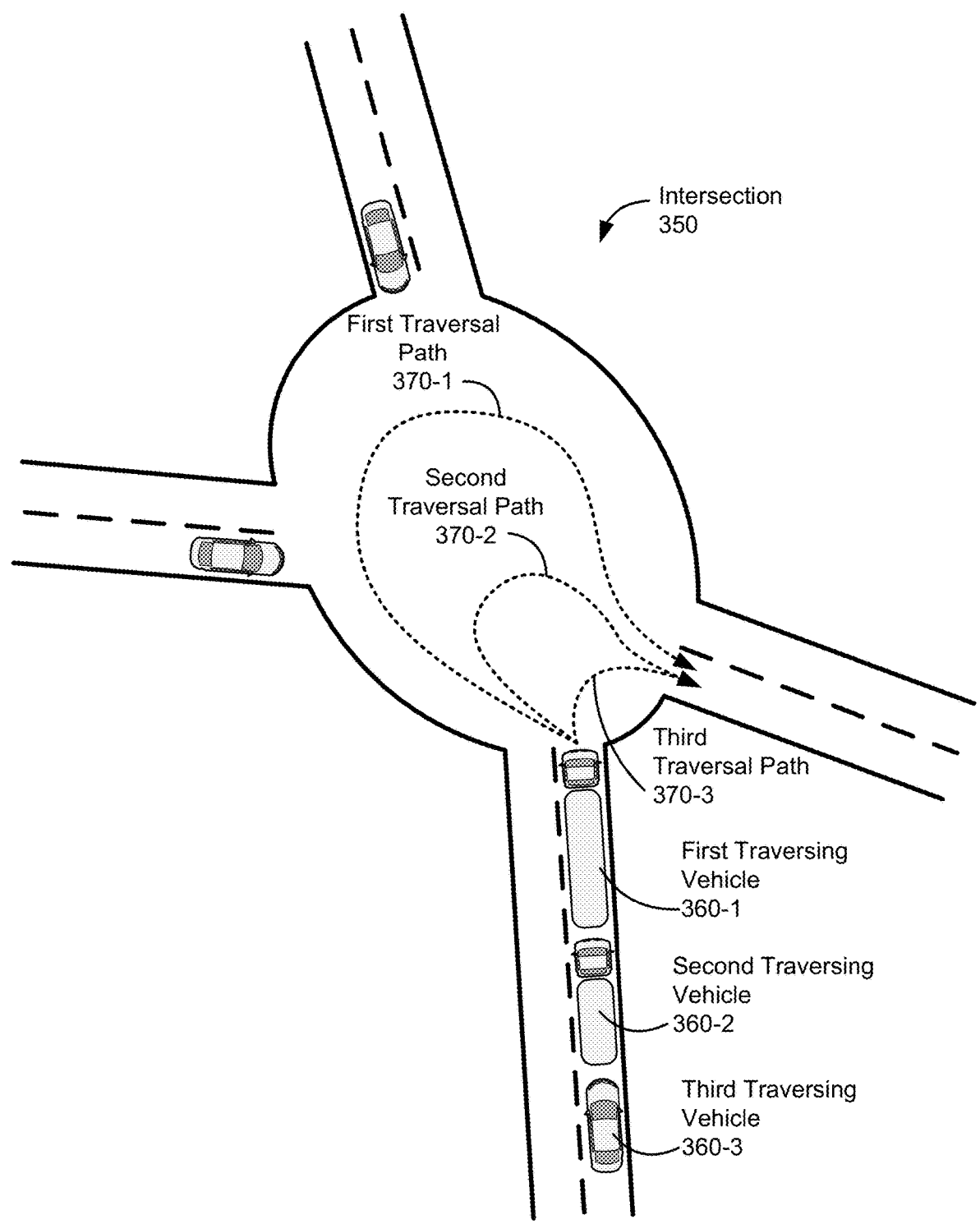

FIGS. 3A-3C are additional overhead views of various types of intersections 300, showing how a traversing vehicle can impact traffic at the intersection in different ways when traveling along a traversal path.

The intersection 300 illustrated in FIG. 3A is a traditional grid-based intersection of two roads. Here, a traversing vehicle 305 is a large, articulated vehicle that travels along a traversal path 310 through various portions of the intersection over a period of time. As can be seen, this can impact potential traversal paths 315 of another vehicle 320 differently. That is, some potential traversal paths 315 may be available to the vehicle 320 at any time while the traversing vehicle 305 is traveling along the traversal path 310. On the other hand, at least portions of other potential traversal paths

315 may be inaccessible during at least a portion of the time the traversing vehicle 305 is traveling along the traversal path 310.

FIG. 3B illustrates an intersection 325 comprising a roundabout. Here, a traversing vehicle 330 (also a large, articulated vehicle) travels along the traversal path 335. However, the potential traversal path 340 is accessible to another vehicle 345. Accordingly, the other vehicle 345 may be able to travel through the intersection 325 along the potential traversal path 340 at any time the traversing vehicle 330 is traveling along the traversal path 335.

In FIG. 3C, a third intersection 350 comprises a non-grid intersection impacted differently by different traversing vehicles 360. A first traversing vehicle 360-1, a second traversing through vehicle 360-2, and a third traversing vehicle 360-3 respectively travel along a first traversal path 370-1, a second traversal path 370-2, and a third traversal path 370-3. Not only do the traversal paths 370 cover different portions of the intersection 350, but also other characteristics (speed, size, etc.) of the different traversing vehicles 360 may impact the intersection 350 differently.

With these considerations in mind, embodiments can provide for effective messaging for intersection management by determining traversal paths for vehicles to take traveling navigating through an intersection, and communicating messages (e.g., using CV2X) that provide sufficient information to describe these determines traversal paths. This can be done in an efficient manner, to help minimize the bandwidth used to communicate these messages. According to embodiments, various input parameters (in addition to ingress point at egress point) can be taken into consideration when determining a traversal path for a traversing vehicle to take through an intersection.

According to some embodiments, input parameters for defining a traversal path through an intersection may include parameters regarding intersection geometry. Intersection geometry can include, for example, the number of lanes as the lane width for each of the roads of the intersection, the location of each of the ingress and egress points, and temporary features that could impact travel through the intersection. These temporary features could include, for example, work zones, impediments due to weather (e.g., a snowbank, ice slick, etc.), other temporary impediments (e.g., potholes, uneven lanes, etc.), and the like.

Techniques for describing intersection geometry can vary, depending on desired functionality. According to some embodiments, intersection geometry can be described using classifications set by existing standards (e.g., SAE/ETSI standards) for describing the various features (number of lanes, and ingress/egress locations, etc.). In some embodiments, locations may be described relative to a map. Also, references to "ETSI" herein refer to all relevant ETSI standards, including ETSI Intelligent Transport Systems (ETSI-ITS).

Because each vehicle, as a function of its static and dynamic characteristics, occupies a certain portion of an intersection at any particular time, Additionally or alternatively, these static and dynamic characteristics regarding a traversing vehicle may additionally or alternatively be used as input parameters for determining a traversal path through an intersection. Static vehicle characteristics can include fixed physical traits, such as vehicle size and type. With regard to vehicle type, this can include whether a vehicle is a passenger car, truck, articulated truck, includes a trailer or towed load, or the like. According to some embodiments, or specific information about a vehicle can be conveyed, including model and/or trim type. Dynamic characteristics can include stopping distance, turning radius, acceleration, deceleration, and/or other variable traits of a vehicle. Again, according to some embodiments, techniques for describing static and/or dynamic vehicle characteristics may use definitions set by existing standards.

With these inputs, a traversing vehicle, RSU, or other traffic entity can determine the traversing vehicle's traversal path through an intersection and create an intersection trajectory message (ITM) to communicate the proposed traversal path to other connected (CV2X) traffic entities. Furthermore, according to some embodiments, the traversal path can be segmented into multiple segments, and respective "conflicts" can be determined to indicate which egress and ingress points may be blocked when the vehicle is traversing each segment of the traversal path.

Figure 4B:
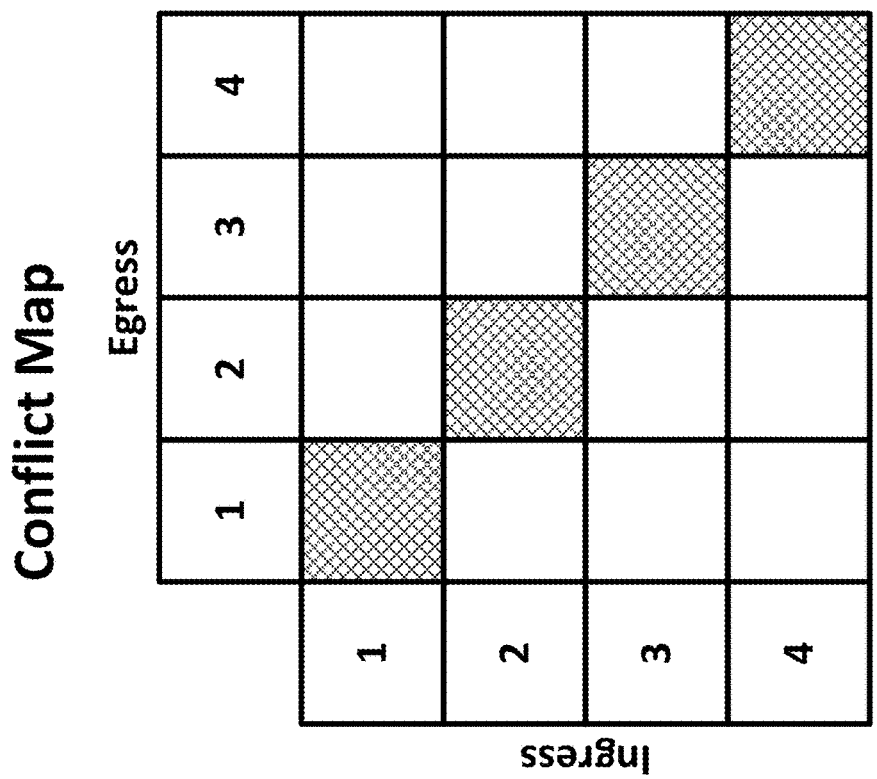
FIG. 4B is a diagram illustrating a conflict map that can be used to illustrate how various ingress-to-egress paths of the intersection shown in FIG. 4A may be blocked as the traversing vehicle of FIG. 4A travels along the trajectory lane.
Figure 4A:
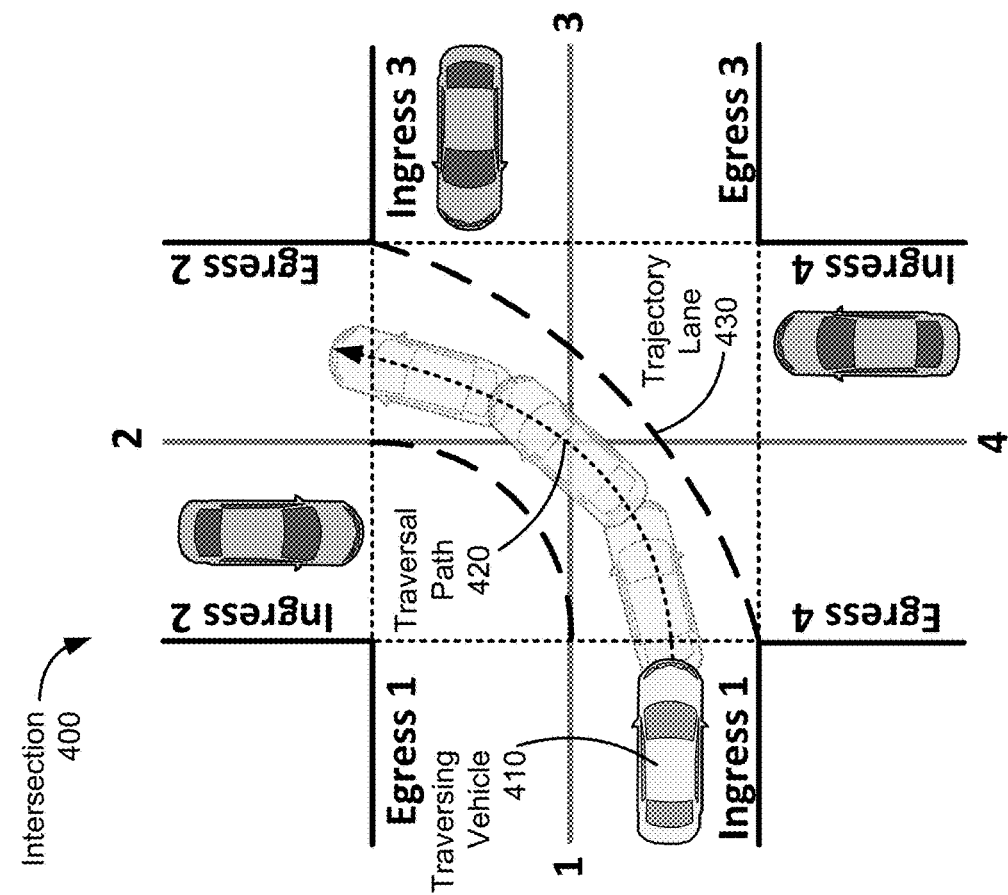
FIG. 4A is an overhead view of an intersection through which a traversing vehicle intends to travel via a trajectory lane, according to an embodiment.

FIGS. 4A and 4B helps illustrate the basic setup of how this can be done. FIG. 4A is an overhead view of an intersection 400 through which a traversing vehicle 410 intends to travel, with enumerated ingress and egress points as shown. Using the inputs above, the traversing vehicle 410 (or RSU or other traffic entity) can determine a traversal path 420 for the traversing vehicle 410 through the intersection 400. More particularly, the traversing vehicle 410 can determine a trajectory lane 430 comprising an area of the intersection 400 on which the traversing vehicle 410 will travel when traversing along the traversal path 420. FIG. 4B illustrates a corresponding conflict map used to illustrate how access to egress points of the intersection 400 from ingress points of the intersection 400 can be blocked over the course of the traversing vehicle's travel along the traversal path 420, in view of the dimensions of the trajectory lane.

An ITM can be created and sent to convey this information related to the traversal path (including egress and ingress conflicts) prior to the arrival of the traversing vehicle 410 at the intersection 400, thereby allowing for management of the intersection 400 (e.g., by RSU controlling traffic through the intersection 400, or among the vehicles themselves). According to some embodiments, the ITM may do so by segmenting the intersection 400 along the trajectory lane 430 and providing information regarding each of the segments, as shown in FIGS. 5A-7B.

Figure 5B:
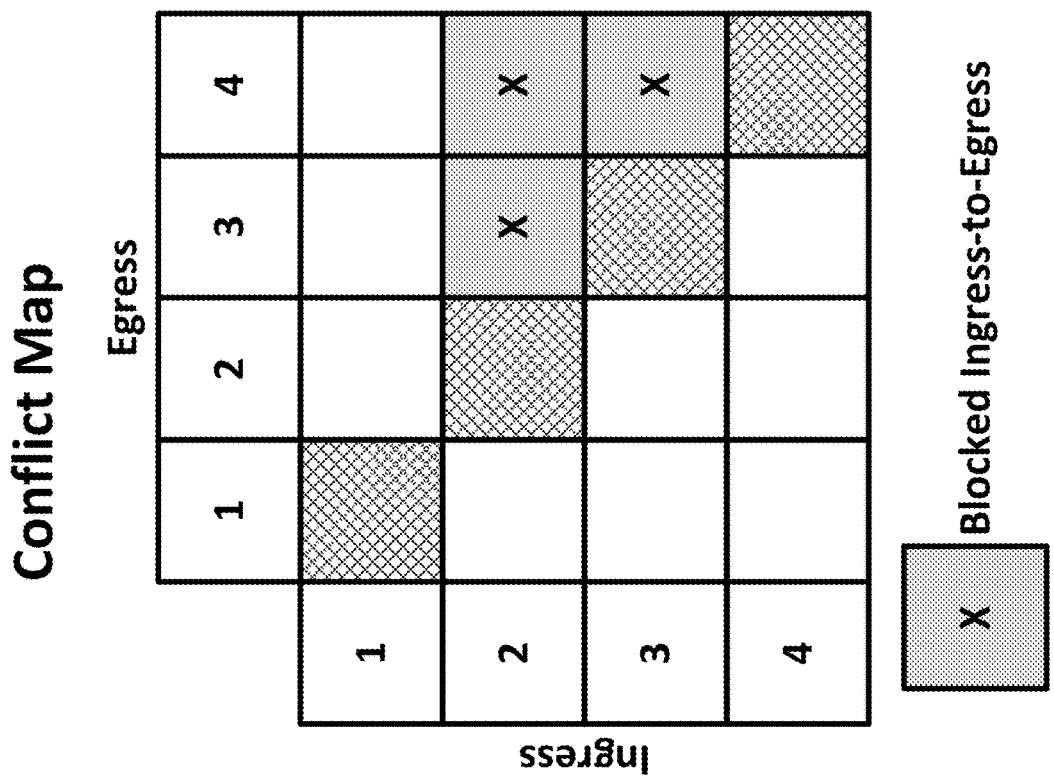
FIG. 5B is a conflict map for the first segment shown in FIG. 5A, according to an embodiment.
Figure 5A:
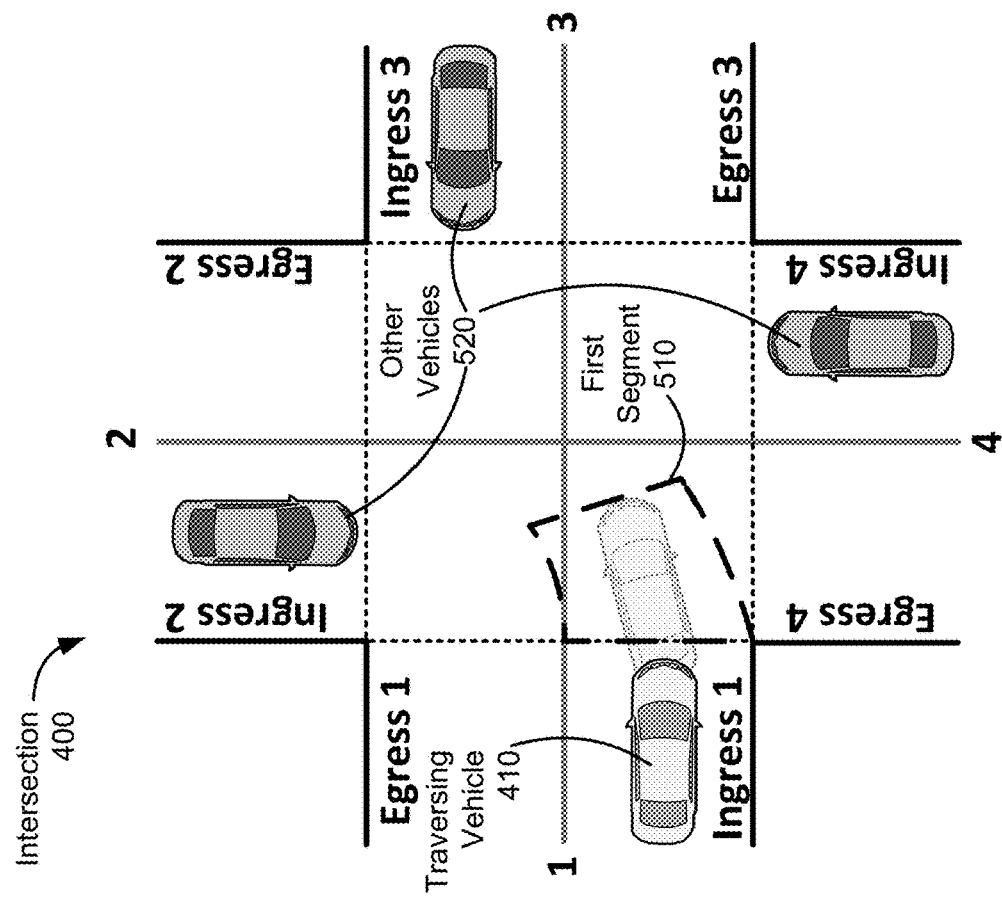
FIG. 5A is an overhead view illustrating a first segment of the trajectory lane of FIG. 4B, according to an embodiment.

FIG. 5A illustrates a first segment 510 of the trajectory lane 430 of intersection 400 for traversing vehicle 410. FIG. 5B illustrates the ingress-to-egress pathways that are blocked to other vehicles 520 when the traversing vehicle 410 is in the first segment 510. For example, because the traversing vehicle 410 is adjacent to Egress 4, traversal through the intersection 400 by other vehicles from Ingress 2 or Ingress 3 to Egress 4 are blocked. Additionally, the pathway from Ingress 2 to Egress 3 is also blocked.

Figure 6B:
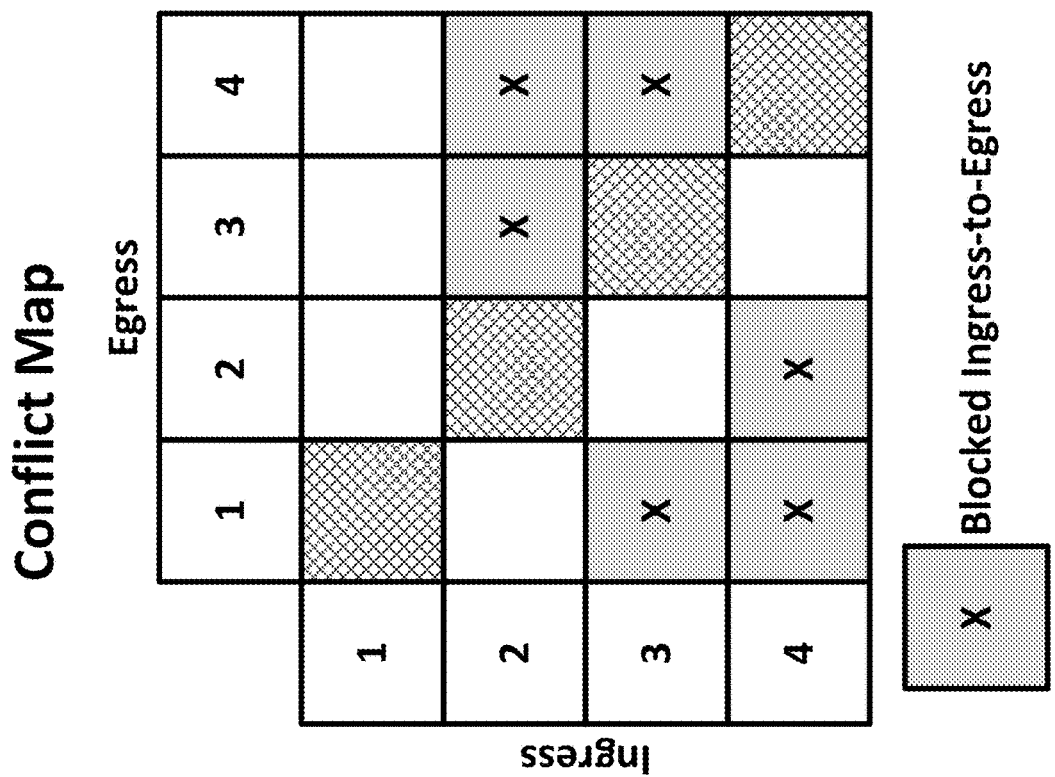
FIG. 6B is a conflict map for the second segment shown in FIG. 6A, according to an embodiment.
Figure 6A:
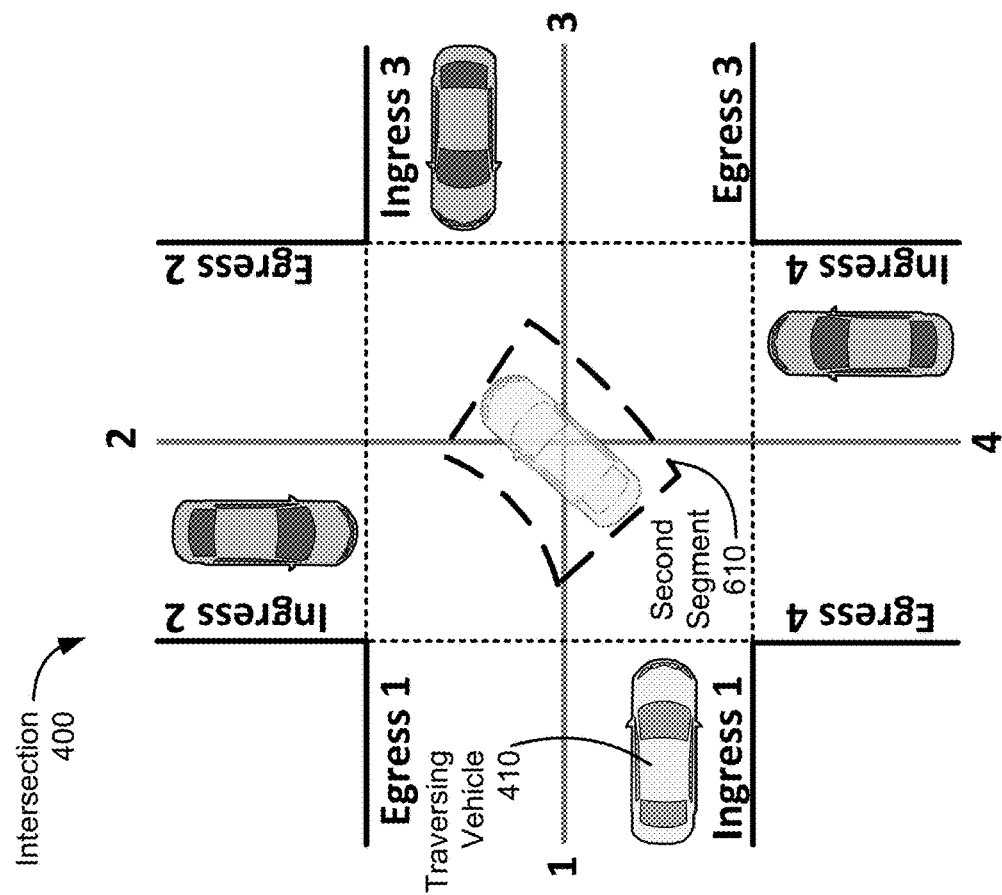
FIG. 6A is an overhead view illustrating a second segment of the trajectory lane of FIG. 4B, according to an embodiment.

FIG. 6A illustrates a second segment 610 of the trajectory lane 430 of intersection 400 for traversing vehicle 410. Again, correspondingly, FIG. 6B illustrates the ingress-to-egress pathways that are blocked to other vehicles when the traversing vehicle 410 is in the second segment 610. As shown, because the traversing vehicle 410 is near the center of the intersection 400, many pathways are blocked. This leaves only right-hand turns available to the other vehicles: from Ingress 2 to Egress 1, from ingress 3 to Egress 2, and from Ingress 4 to Egress 3.

Figure 7B:
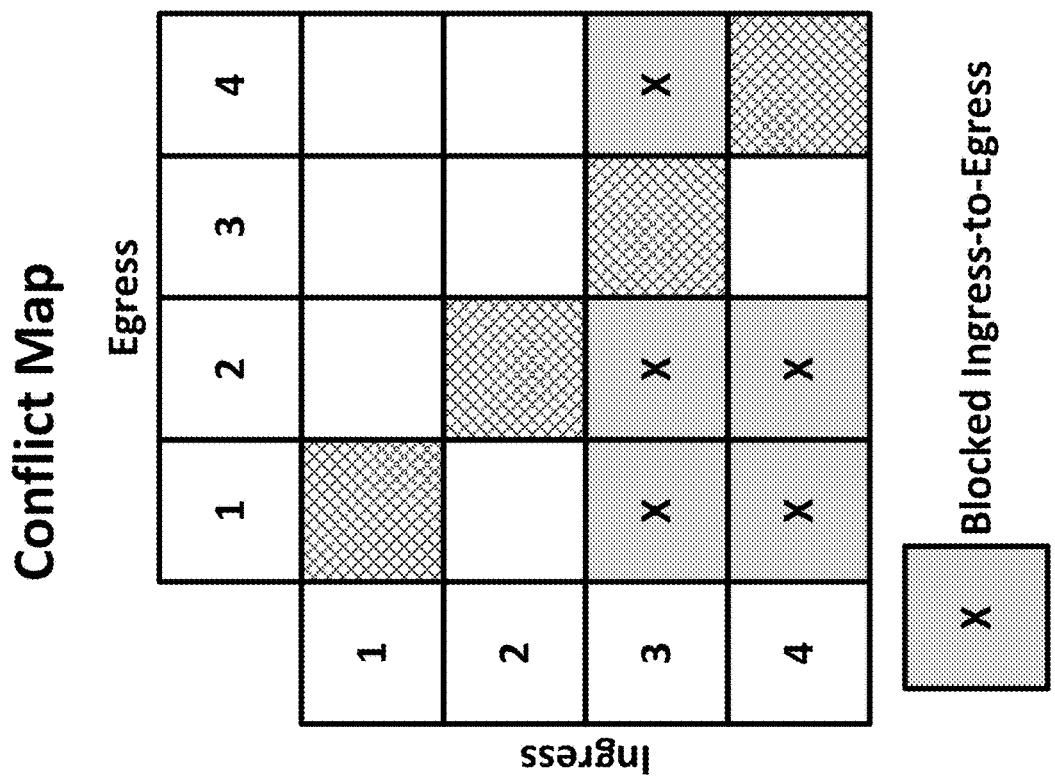
FIG. 7B is a conflict map for the third segment shown in FIG. 7A, according to an embodiment.
Figure 7A:
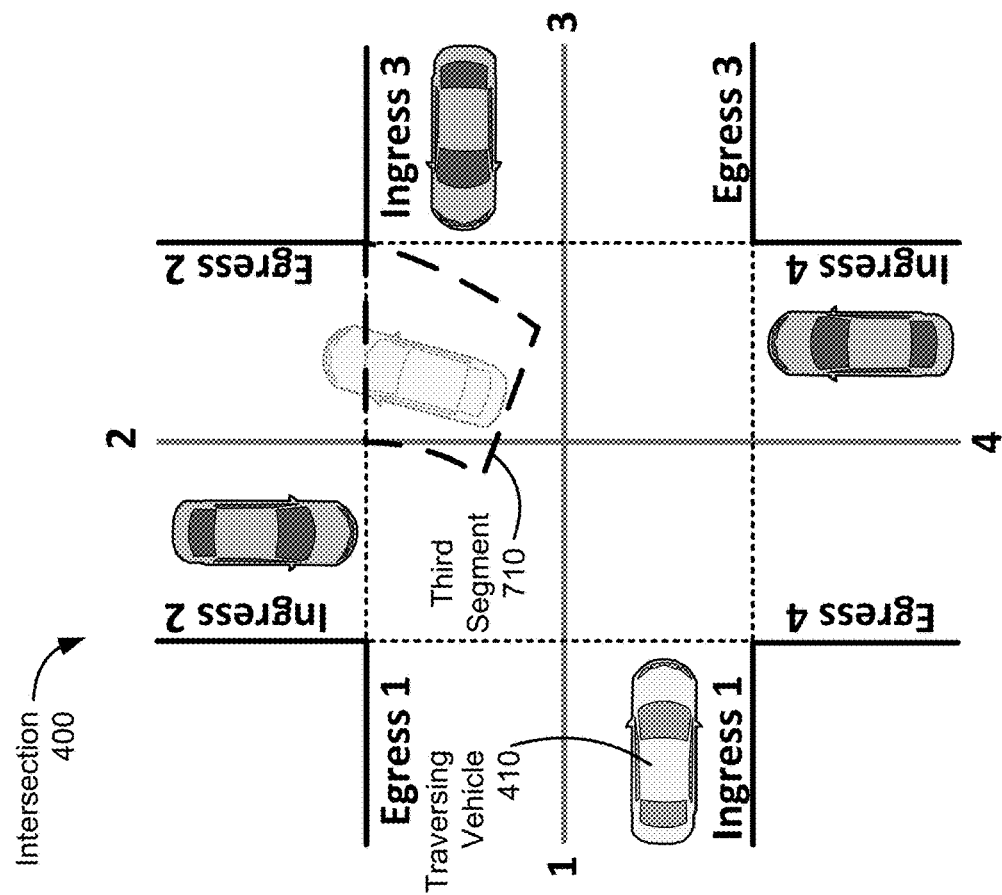
FIG. 7A is an overhead view illustrating a third segment of the trajectory lane of FIG. 4B, according to an embodiment.

FIG. 7A illustrates a third segment 710 of the trajectory lane 430 of intersection 400 for traversing vehicle 410. FIG. 7B illustrates the corresponding ingress-to-egress pathways that are blocked to other vehicles when the traversing vehicle 410 is in the third segment 610. Here, the pathways blocked include all pathways from Ingress 3, as well as the pathways from Ingress 4 to Egress 1 and Ingress 4 to Egress 2.

Although the example illustrated in FIGS. 5A-7B illustrated the trajectory lane 430 being defined by three segments, the number of segments and manner of segmentation can vary, depending on desired functionality. As with the trajectory lane 430 itself, segmentation can be based on intersection geometry, vehicle characteristics, and ingress/egress points, for example. Depending on desired functionality, segmentation may be highly granular (many segments) or coarse (fewer segments). An optimal amount of segments may depend on the input characteristics of a particular intersection and particular traversing vehicle.

According to some embodiments, segments may be at least partly based on how ingress and egress points are blocked. That is, as shown in FIGS. 5A-7B, a trajectory lane 430 may be segmented such that each segment has a different conflict map. Put differently, segments may be defined based on determining the trajectory lane 430 of a traversing vehicle 410 and how egress and ingress points are blocked as the traversing vehicle 410 travels along the traversal path 420. A new segment of the trajectory lane 430 may be generated for each instance the corresponding conflict map with change as the traversing vehicle 410 travels along the traversal path 420. As explained in further detail below, once segments are determined, information regarding the segments can be determined, such as the traversing vehicle's arrival and departure from each segment.

As noted, determination of the trajectory lane 430, segments, and other information regarding the traversing vehicle's proposed traversal of the intersection 400 can be determined by a traffic entity (e.g., the traversing vehicle 410, or an RSU managing the intersection 400) prior to the traversing vehicle's arrival at the intersection 400. This information can be communicated to other entities at or near the intersection (e.g., from RSU to traversing vehicle 410, or vice versa) for intersection management.

Information included in the ITM may vary, depending on desired functionality. Generally put, and ITM can include information regarding the traversing vehicle 410, the traversal path 420 (which can include the trajectory lane 430 within the intersection 400 and/or segments thereof), and ingress and egress points that would be blocked as the traversing vehicle 410 travels along the traversal path 420. According to some embodiments, the content of the ITM can be described as shown in Table 1.

TABLE 1

| ITM Content Intersection Traversal Message (ITM) |
| --- |
| Requesting Vehicle |
| Segment Count |
| Segment Element 1 |
| Segment Element 2 |
| Segment Element n |

As shown in Table 1, for a trajectory lane 430 having n segments, an ITM may include information regarding the requesting vehicle, a segment count, and information regarding each of the n segments. According to some embodiments, the ITM may use new data elements as well as and existing data elements as defined by SAE and/or ETSI.

Information regarding the requesting vehicle may comprise information sufficient to identify the requesting vehicle (e.g., the vehicle requesting traversal of an intersection) from among other vehicles. This can include existing definitions for a requesting vehicle under SAE/ETSI and/or other information. In some embodiments, for example, this may include a Vehicle Identification Number (VIN) or other unique identifier, a vehicle description, or the like.

The segment count may simply be an integer value of n, indicating the number of segments included in the ITM.

The data conveyed for each of the n segments in the ITM can vary, depending on desired functionality. In some embodiments, the information may include, for each segment:

A description of the respective segment;
The traversing vehicle's estimated time of arrival (ETA) to the respective segment;
The traversing vehicle's estimated time of departure (ETD) from the respective segment; and
An indication of which intersection ingress and egress points are blocked during the time the traversing vehicle is in the respective segment (from the ETA to ETD).

According to some embodiments, intersection geometry may be determined using existing messages, such as the SAE J2735 MAP message. Segments may be defined as overlays on a map of the intersection. According to some embodiments, the description of the respective segment may be done using existing construct. One such example being the SAE GenericLane data field. Additional details regarding the information that can be conveyed in an ITM for each segment, according to one embodiment, are shown in Table 2.

TABLE 2

| ITM Segment Information | | | |
| --- | --- | --- | --- |
| Top-Level DF | DF, DE | Contents | Description |
| Segment Element | Segment_ETA | DE_MinuteOfTheYear | Estimated Time of Arrival to segment start |
| | Segment_ETD | DE_MinuteOfTheYear | Estimated Time of Departure from segment end |
| | SegmentGeometry | DF_GenericLane | Segment lane definition |
| | IntersectionIngress | DE_ApproachID | Intersection ingress point |
| | IntersectionEgress | DE_ApproachID | Intersection egress point |
| | DF_IngressAccessBlocked | Number (count) Integer | Number of Ingress points blocked by segment |
| | Ingress Identifier | DE_ApproachID | ID of Ingress point blocked by segment |
| | Ingress Identifier | DE_ApproachID | ID of Ingress point blocked by segment (Number instances) |
| | DF_EgressAccessBlocked | Number (count) Integer | Number of Egress points blocked by segment |
| | Egress Identifier | DE_ApproachID | ID of Egress point blocked by segment |
| | Egress Identifier | DE_ApproachID | ID of Egress point blocked by segment (Number instances) |

As shown in the descriptions of various data fields (DFs) and data elements (DEs) provided in Table 2, and ITM may include a large amount of information for each of the segments. This can include not only the previously-mentioned information (segment description, ETA and ETD, and an indication of ingress/egress points blocked) for each segment, but also a number of ingress points blocked and/or egress points blocked when the traversing vehicle is in the respective segment. As a person of ordinary skill in the art will appreciate, some DEs and DFs provided in Table 2 may correspond to DEs and DFs currently defined by relevant SAE and/or ETSI standards. (For example, DF_GenericLane may correspond to the data field GenericLane defined by SAE. DE_MinuteOfTheYear, DF_GenericLane, and/or DE_ApproachID may also correspond to data elements/fields defined by SAE, with equivalents defined by ETSI-ITS.) Accordingly, some embodiments may generate and communicate ITMs that utilize some or all of these existing standards-based definitions. That said, other embodiments may additionally or alternatively use proprietary definitions for these DEs and DFs.

As an example, the information shown in Table 1 and Table 2 can be applied to the example illustrated in FIGS. 5A-7B as follows. As the traversing vehicle 410 approaches the intersection 400, a traffic entity (e.g., the traversing vehicle 410 itself, or and RSU) can determine a traversal path 420 for the traversing vehicle 410, as well as the trajectory lane 430 and corresponding segments (first segment 510, second segment 610, and third segment 710).

As previously indicated, the traffic entity creating and sending an ITM that communicates the traversal path 420 may comprise a vehicle intending to traverse an intersection (traversing vehicle 410) or an infrastructure component managing the intersection, such as an RSU (not shown) located near the intersection 400. When the ITM is created by an RSU, the RSU utilizes characteristics of the traversing vehicle 410, which may be received by a message such as a BSM, or may be detected by the RSU, or both. (As a person of ordinary skill in the art will appreciate, a BSM is a message periodically sent by a vehicle, conveying information about the vehicle such as size, speed, direction (or motion vector), whether it is towing a trailer, etc.) When the ITM is created by the traversing vehicle 410, this information is known.

With this information regarding the traversing vehicle 410, the traffic entity can determine traversal path 420. The traversal path 420 may be known a priori for the particular intersection 400, based on vehicle classification of the traversing vehicle 410 and geometry of the intersection 400. Alternatively, the traversal path 420 can be calculated by the traffic entity in real time, based on the intersection geometry and vehicle characteristics.

With the traversal path 420 determined, the traffic entity can then create an ITM that includes an identifier for the traversing vehicle 410, a segment count of 3, and information, for each of the three segments. For each of the three segments, a respective ETA and ETD of the traversing vehicle 410 can be provided by Segment_ETA and Segment_ETD, respectively. The geometry of the segment can be conveyed using SegmentGeometry, and ingress and egress points can be provided by IntersectionIngress and IntersectionEgress, respectively. The conflict map for each segment can be conveyed by using DF_IngressAccessBlocked and DF_EgressAccessBlocked to respectively indicate the ingress and egress points blocked by the respective segment.

Once the ITM is created, the traffic entity that created the ITM can then send it to other traffic entities. In embodiments where the traversing vehicle 410 create the ITM, the traversing vehicle 410 can send it to an RSU and/or other nearby vehicles for intersection management by the RSU (if the intersection 400 is RSU managed) or among the vehicles (if the intersection 400 is managed among the vehicles themselves).

In general, an ITM can be created and sent to traffic entities as a traversing vehicle approaches and intersection. According to some embodiments, this can mean the ITM is created and sent (e.g., either by the traversing vehicle or an RSU) when the traversing vehicle is within a threshold distance of the intersection. This distance may vary by intersection, and may be based on factors to help optimize bandwidth for traffic-management (e.g., CV2X) communication for an intersection.

According to some embodiments, the timing of the creation and sending of the ITM may be additionally based on the velocity of the vehicle. That is, the ITM may be created and sent based on both distance and velocity of the vehicle, which may be indicative of a time at which a traversing vehicle may be at (or within a threshold distance to) an intersection. According to some embodiments, the ITM may be created and sent prior to an established "time to collision." For example, a time to collision of four seconds is a current well-known standard, and may therefore be used in some embodiments. However, other embodiments may cause the ITM to be created and sent using a longer or shorter time to collision. More generally, the creating and transmission of an ITM may be based on the required reaction time of other vehicles in or approaching the intersection. The reaction time, may be determined by vehicle speed and/or distance to the intersection.

Although an ITM may comprise new information (e.g., segmentation of a trajectory lane, ingress/egress points blocked, etc.) and therefore may be created and communicated independent of current governing standards, embodiments are not so limited. According to some embodiments, some or all of the contents of an ITM may be incorporated into existing messages as defined by SAE and/or ETSI. That is, one or more currently-defined application-layer messages as defined by SAE or ETSI-ITS, such as a signal request message or signal response message related to an intersection, can be modified to include some or all of the information provided in an ITM, according to some embodiments.

Figure 8:
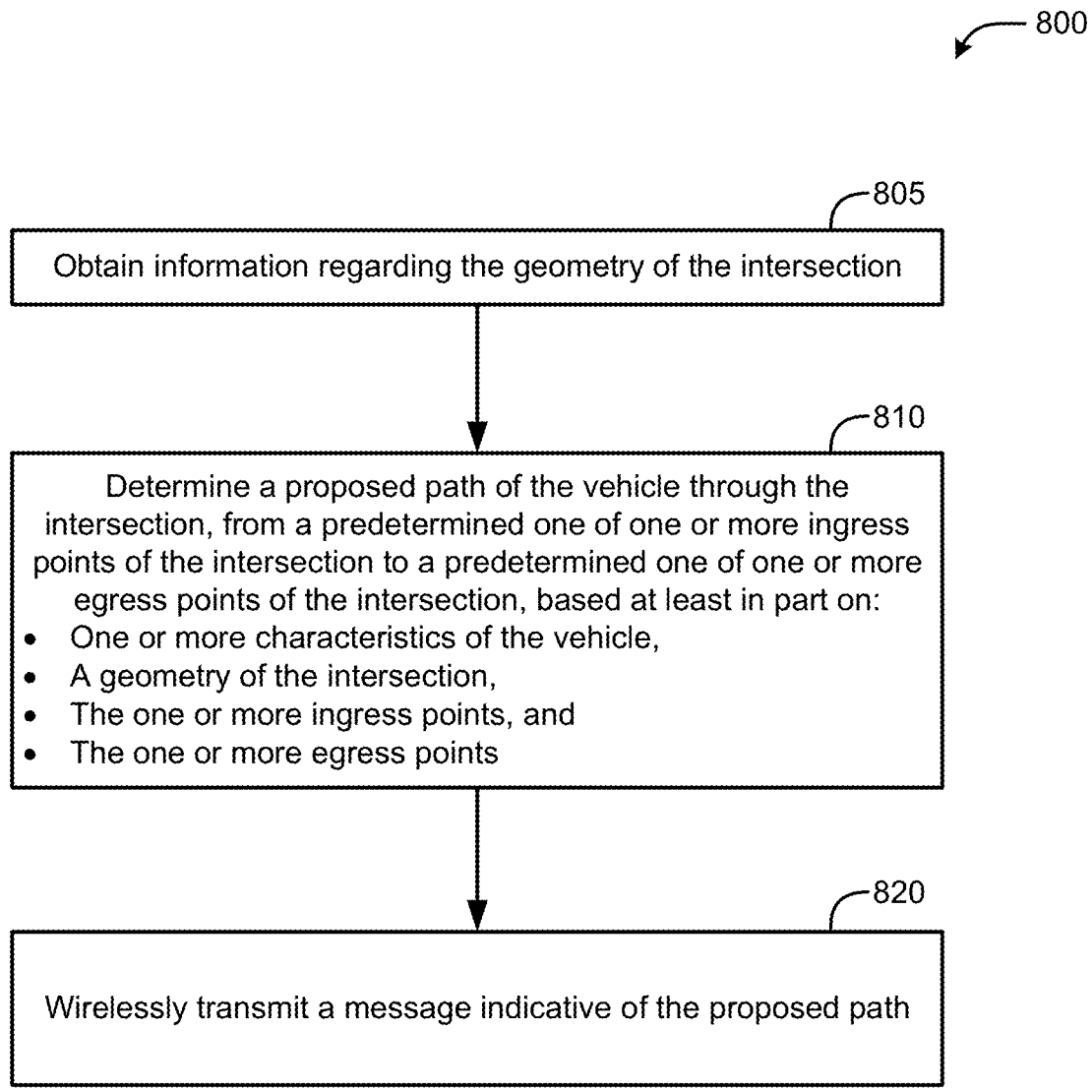
FIG. 8 is a flow diagram of a method of communicating information for traversal of a vehicle through a traffic intersection, according to an embodiment.

FIG. 8 is a flow diagram of a method 800 of communicating information for traversal of a vehicle through a traffic intersection, according to an embodiment. The method 800 is intended to broadly capture the techniques discussed in the previously-described embodiments. As such, the functions described in the blocks illustrated in FIG. 8 may be performed by the vehicle and/or another traffic entity (e.g., an RSU) communicatively coupled with the vehicle. More specifically, the functions of the method 800 may be performed by hardware and/or software components of a vehicle and/or traffic entity, such as the mobile computer system illustrated in FIG. 9 and/or the traffic entity computer illustrated in FIG. 10, both of which are described in more detail below.

The functionality at block 805 comprises obtaining information regarding the geometry of the intersection. The geometry of the intersection may be obtained, for example, from a map, which may be stored locally at the vehicle and/or other traffic entity and/or obtained from a map database. Updates regarding a temporary traffic condition of the intersection (e.g., a stalled vehicle, closed lane, etc.) may also be obtained. In some embodiments, these temporary traffic conditions may accompany map information regarding the intersection. Means for performing the functionality at block 805 may comprise hardware and/or software components of a mobile computer system disposed on the vehicle, such as the bus 905, processing unit(s) 910, memory 960, wireless communication interface 930, and/or other components of the mobile computer system 900 illustrated in FIG. 9 and described in more detail below. Additionally or alternatively, means for performing the functionality at block 805 may comprise hardware and/or software components of a traffic entity computer, such as the bus 1005, processing unit(s) 1010, storage device(s) 1025, working memory 1035, communications subsystem 1030, and/or other components of the fixed computer system 1000 illustrated in FIG. 10 and described in more detail below.

The functionality at block 810 comprises determining a proposed path of the vehicle through the intersection, from a predetermined one of one or more ingress points of the intersection to a predetermined one of one or more egress points of the intersection, based at least in part on one or more characteristics of the vehicle, a geometry of the intersection, the one or more ingress points, and the one or more egress points. As indicated in the previously-described embodiments, a proposed path of the vehicle can significantly very depending on the geometry of the intersection (e.g., a roundabout vs. a grid-based intersection), static characteristics of the vehicle (e.g., size, weight, articulation, etc.), and dynamic characteristics of the vehicle (e.g., acceleration, stopping distance, turning radius, etc.). As noted, characteristics of the vehicle may comprise vehicle size, vehicle type, vehicle model, whether the vehicle is towing a trailer or towed load, stopping distance, turning radius, acceleration, or deceleration, or any combination thereof. Additionally or alternatively, the one or more characteristics of the vehicle, may be stored locally at and/or otherwise obtained by the vehicle and/or other traffic entity. Egress and ingress points may be provided by a navigation system of the vehicle (or another traffic source having navigation information of the vehicle) to the entity determining the proposed path of the vehicle through the intersection.

As noted, a proposed path of the vehicle may be calculated by the traffic entity (e.g., vehicle or RSU), or may be known a priori for an intersection as a function of vehicle characteristics, depending on desired functionality. Thus, according to some embodiments, determining a proposed path of the vehicle through the intersection may comprise making a real-time calculation to determine the proposed path of the vehicle or looking up a predetermined path (e.g., in a database or lookup table) to determine the proposed path. In the latter case, the information in the database or lookup table could be provisioned in an infrastructure component, pre-positioned in the vehicle (e.g., upon manufacture), or sent to the vehicle (e.g., via wireless communications).

Means for performing the functionality at block 810 may comprise hardware and/or software components of a mobile computer system disposed on the vehicle, such as the bus 905, processing unit(s) 910, memory 960, and/or other components of the mobile computer system 900 illustrated in FIG. 9 and described in more detail below. Additionally or alternatively, means for performing the functionality at block 810 may comprise hardware and/or software components of a traffic entity computer, such as the bus 1005, processing unit(s) 1010, storage device(s) 1025, working memory 1035, and/or other components of the fixed computer system 1000 illustrated in FIG. 10 and described in more detail below.

At block 820, the functionality comprises wirelessly transmitting a message indicative of the proposed path. As indicated in the embodiments above, the timing of the creation and transmittal of the message may be based on the vehicle's distance to the intersection and/or the estimated time of arrival of the vehicle at the intersection. Accordingly, according to some embodiments, the method 800 may further comprise transmitting the message indicative of the proposed path in response to a triggering event, where the triggering event comprises a determination that the vehicle is within a threshold distance of the intersection, a determination that the vehicle will arrive within a threshold distance of the intersection within a threshold amount of time, or both. In some embodiments, the triggering event may be further based on a determination that a second vehicle is within a certain proximity of the intersection and/or vehicle, in which case the vehicle may choose to send the message at an earlier point in time, to help ensure management of the intersection prior to the arrival of one or both vehicles at the intersection. Additionally or alternatively, the message indicative of the proposed path may comprise an application-layer message as defined by the SAE or ETSI-ITS.

Means for performing the functionality at block 820 may comprise hardware and/or software components of a mobile computer system disposed on the vehicle, such as the bus 905, processing unit(s) 910, memory 960, wireless communication interface 930, and/or other components of the mobile computer system 900 illustrated in FIG. 9 and described in more detail below. Additionally or alternatively, means for performing the functionality at block 810 may comprise hardware and/or software components of a traffic entity computer, such as the bus 1005, processing unit(s) 1010, storage device(s) 1025, working memory 1035, wireless communications interface 1033, and/or other components of the fixed computer system 1000 illustrated in FIG. 10 and described in more detail below.

As noted in the above-described embodiments, the contents of the message may vary, depending on desired functionality. According to some embodiments, for example, the message may include blocking information. More specifically, the message may include ingress and egress blocking information indicative of which of the one or more ingress points and which of the one or more egress points will be blocked by the vehicle during a period of time in which the vehicle is expected to traverse through the intersection on the proposed path.

According to some embodiments, a proposed path may be segmented. Segments of the proposed path may comprise segments of a trajectory lane that would be occupied by the vehicle at different points in time as the vehicle travels along the traversal path. According to some embodiments, therefore, the message includes information indicative of one or more segments of the proposed path. Further, for each segment, the message can include a time of arrival (e.g., ETA) of the vehicle at the respective segment, and a time of departure (e.g., ETD) of the vehicle from the respective segment. Furthermore, according to some embodiments, the ingress and egress blocking information may be indicative of, for each segment, which of the one or more ingress points and which of the one or more egress points will be blocked by the vehicle between the time of arrival of the vehicle at the respective segment and the time of departure of the vehicle from the respective segment.

As previously noted, the segments of a trajectory lane may vary, depending on desired functionality. For example, according to some embodiments, the one or more segments may comprise a plurality of segments, and wherein to segments of the plurality of segments overlap. According to some embodiments, the segments themselves may be determined as part of the method 800. In such embodiments, therefore, the method 800 may further comprise determining for each of the one or more segments, a geometry of the respective segment. In some embodiments, the geometry for each of the one or more segments may be based at least in part on one or more static characteristics of the vehicle, one or more dynamic characteristics of the vehicle, the geometry of the intersection, one or more temporary characteristics of the intersection, the predetermined one of the one or more ingress points, or the predetermined one of the one or more egress points, or any combination thereof.

As noted, the method 800 may be performed by the vehicle and/or a separate traffic entity, such as an RSU that manages the intersection. Accordingly, according to some embodiments, the determining of the proposed path and the wireless transmitting of the message indicative of the proposed path are performed by components onboard the vehicle, such as a mobile computer system. In other embodiments, the determining of the proposed path and the wireless transmitting of the message indicative of the proposed path are performed by components of an RSU, such as a traffic entity computer.

Figure 9:
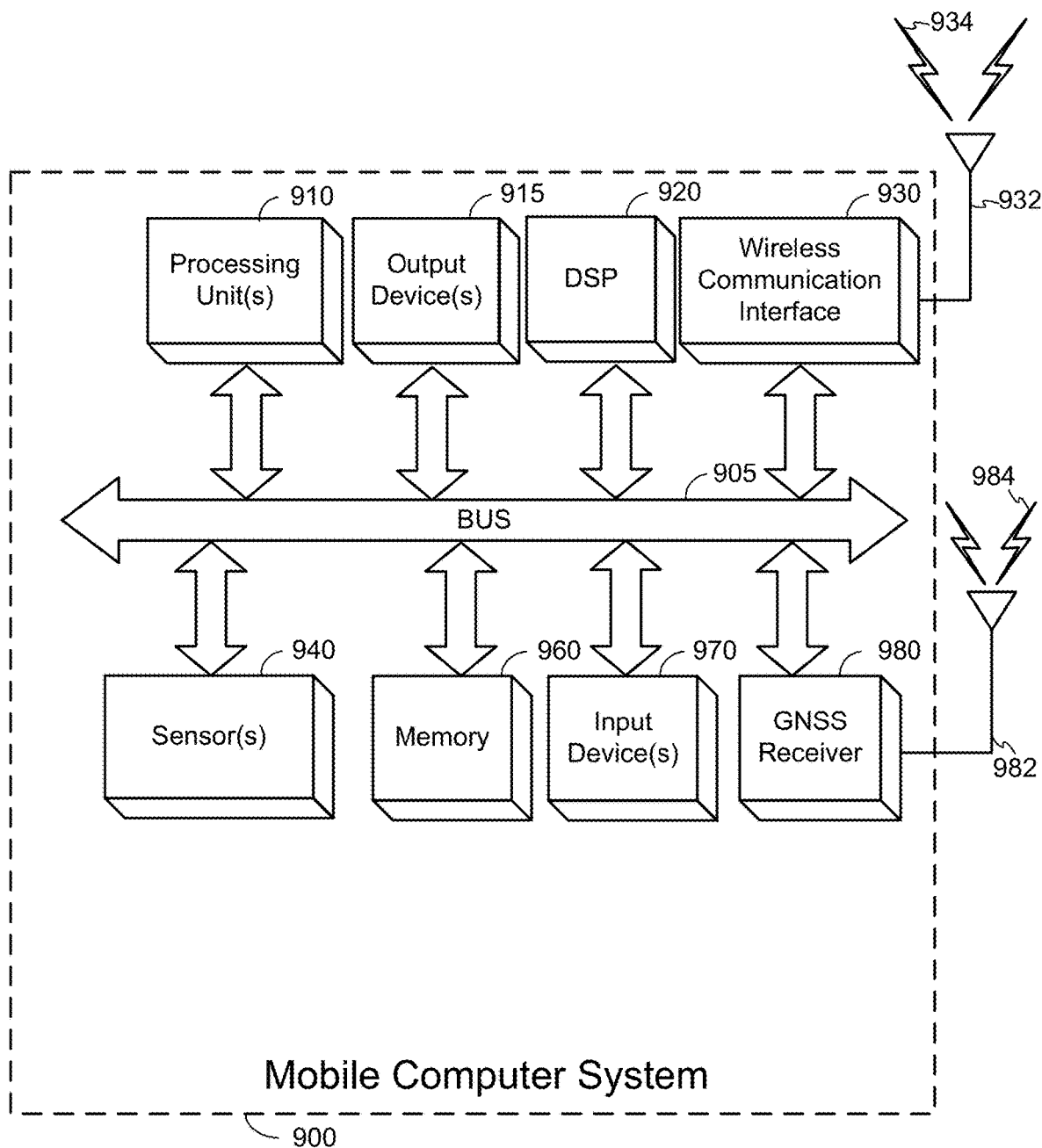
FIG. 9 is a block diagram of an embodiment of a mobile computer system.

FIG. 9 illustrates an embodiment of a mobile computer system 900, which may be utilized as described herein above. For example, the mobile computer system 900 may comprise a vehicle computer system used to manage one or more systems related to the vehicle's navigation and/or automated driving, as well as communicate with other on-board systems and/or other traffic entities. The mobile computer system 900 may be used perform one or more of the functions of method 800 of FIG. 8. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations on a vehicle.

The mobile computer system 900 is shown comprising hardware elements that can be electrically coupled via a bus 905 (or may otherwise be in communication, as appropriate). The hardware elements may include a processing unit(s) 910 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 9, some embodiments may have a separate Digital Signal Processor (DSP) 920, depending on desired functionality. Location determination and/or other determinations based on wireless communication may be provided in the processing unit(s) 910 and/or wireless communication interface 930 (discussed below). The mobile computer system 900 also can include one or more input devices 970, which can include devices related to user interface (e.g., a touch screen, touch pad, microphone, button(s), dial(s), switch(es), and/or the like) and/or devices related to navigation, automated driving, and the like. Similarly, the one or more output devices 915 may be related to interacting with a user (e.g., via a display, light emitting diode(s) (LED(s)), speaker(s), etc.), and/or devices related to navigation, automated driving, and the like.

The mobile computer system 900 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device and/or various cellular devices, etc.), and/or the like, which may enable the mobile computer system 900 to communicate to other traffic entities (e.g., RSUs, other vehicles, etc.). The communication can be carried out via one or more wireless communication antenna(s) 932 that send and/or receive wireless signals 934.

The mobile computer system 900 can further include sensor(s) 940. Sensors 940 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like). Sensors 940 may be used, for example, to determine certain real-time characteristics of the vehicle, such as location, velocity, acceleration, and the like.

Embodiments of the mobile computer system 900 may also include a GNSS receiver 980 capable of receiving signals 984 from one or more GNSS satellites using an antenna 982 (which could be the same as antenna 932). Positioning based on GNSS signal measurement can be utilized to determine a current location of the vehicle, which, as discussed above, may be used as a trigger for determining and/or sending an ITM as described herein. The GNSS receiver 980 can extract a position of the mobile computer system 900, using conventional techniques, from GNSS satellites of a GNSS system, such as Global Positioning System (GPS) and/or similar systems.

The mobile computer system 900 may further include and/or be in communication with a memory 960. The memory 960 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 960 of the mobile computer system 900 also can comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the mobile computer system 900 (and/or processing unit(s) 910 or DSP 920 within mobile computer system 900). In an aspect, then, such code and/or instructions can be used to configure and/or adapt a general purpose computer (or other device) to perform one or more operations in accordance with the described methods.

Figure 10:
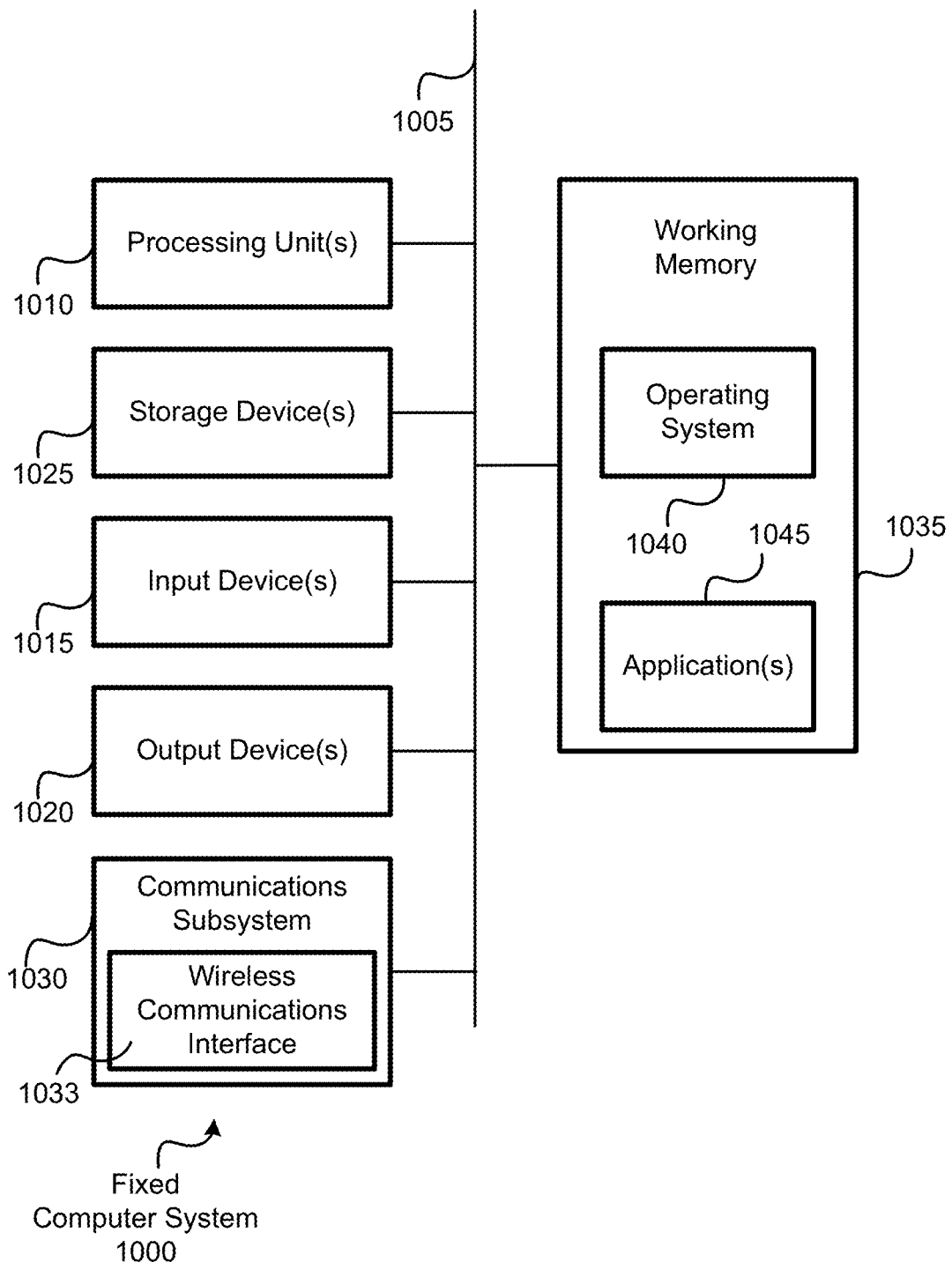
FIG. 10 is a block diagram of an embodiment of a fixed computer system.

FIG. 10 illustrates an embodiment of a fixed computer system 1000, which may be utilized and/or incorporated into one or more components of a fixed traffic entity, such as an RSU or other fixed infrastructure device. FIG. 10 provides a schematic illustration of one embodiment of a fixed computer system 1000 that can perform the methods provided by various other embodiments, such as the method described in relation to FIG. 8. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner. In addition, it can be noted that components illustrated by FIG. 10 can be localized to a single device and/or distributed among various networked devices, which may be disposed at different physical or geographical locations.

The fixed computer system 1000 is shown comprising hardware elements that can be electrically coupled via a bus 1005 (or may otherwise be in communication, as appropriate). The hardware elements may include processing unit(s) 1010, which can include without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIG. 10. The fixed computer system 1000 also can include one or more input devices 1015, which can include without limitation a mouse, a keyboard, a camera, a microphone, and/or the like; and one or more output devices 1020, which can include without limitation a display device, a printer, and/or the like.

The fixed computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a RAM, and/or ROM, which can be programmable, flash-updateable, and/or the like. Such storage devices may be configured to implement any appropriate data stores, including without limitation, various file systems, database structures, and/or the like.

The fixed computer system 1000 may also include a communications subsystem 1030, which can include support of wireline communication technologies and/or wireless communication technologies (in some embodiments) managed and controlled by a wireless communication interface 1033. The communications subsystem 1030 may include a modem, a network card (wireless or wired), an infrared communication device, a wireless communication device, and/or a chipset, and/or the like. The communications subsystem 1030 may include one or more input and/or output communication interfaces, such as the wireless communication interface 1033, to permit data and signaling to be exchanged with a network, vehicles and other mobile devices, other computer systems, and/or any other electronic devices described herein.

In many embodiments, the fixed computer system 1000 will further comprise a working memory 1035, which can include a RAM and/or or ROM device. Software elements, shown as being located within the working memory 1035, can include an operating system 1040, device drivers, executable libraries, and/or other code, such as application(s) 1045, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 8, may be implemented as code and/or instructions that are stored (e.g. temporarily) in working memory 1035 and are executable by a computer (and/or a processing unit within a computer such as processing unit(s) 1010); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as fixed computer system 1000. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the fixed computer system 1000 and/or might take the form of source and/or installable code, which, upon compilation and/or installation on the fixed computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of communicating information for traversal of a vehicle through an intersection, the method comprising:
    obtaining information regarding a geometry of the intersection;
    determining a proposed path of the vehicle through the intersection, from a predetermined one of one or more ingress points of the intersection to a predetermined one of one or more egress points of the intersection, based at least in part on:
        one or more characteristics of the vehicle,
        the geometry of the intersection,
        the one or more ingress points, and
        the one or more egress points; and
    wirelessly transmitting a message indicative of the proposed path, wherein the message includes ingress and egress blocking information indicative of which of the one or more ingress points and which of the one or more egress points will be blocked by the vehicle during a period of time in which the vehicle traverses through the intersection on the proposed path.

2. The method of claim 1, the one or more characteristics of the vehicle comprise:
    vehicle size,
    vehicle type,
    vehicle model,
    whether the vehicle is towing a trailer or towed load,
    stopping distance,
    turning radius,
    acceleration, or
    deceleration, or
    any combination thereof.

3. The method of claim 1, wherein the message includes information indicative of one or more segments of the proposed path, wherein, for each segment, the message further includes:
    a time of arrival of the vehicle at the respective segment, and
    a time of departure of the vehicle from the respective segment.

4. The method of claim 3, wherein the ingress and egress blocking information is indicative of, for each segment, which of the one or more ingress points and which of the one or more egress points will be blocked by the vehicle between the time of arrival of the vehicle at the respective segment, and the time of departure of the vehicle from the respective segment.

5. The method of claim 3, wherein the one or more segments comprise a plurality of segments, and wherein two segments of the plurality of segments overlap.

6. The method of claim 3, further comprising determining, for each of the one or more segments, a geometry of the respective segment.

7. The method of claim 6, wherein the geometry for each of the one or more segments is based at least in part on:
    one or more static characteristics of the vehicle,
    one or more dynamic characteristics of the vehicle,
    the geometry of the intersection,
    one or more temporary characteristics of the intersection,
    the predetermined one of the one or more ingress points, or
    the predetermined one of the one or more egress points, or
    any combination thereof.

8. The method of claim 1, wherein the determining of the proposed path and the wireless transmitting of the message indicative of the proposed path are performed by components onboard the vehicle.

9. The method of claim 1, wherein the determining of the proposed path and the wireless transmitting of the message indicative of the proposed path are performed by components of a Road-Side Unit (RSU).

10. The method of claim 1, wherein the determining of the proposed path comprises:
    looking up a predetermined path in a database, based on the geometry of the intersection, the one or more ingress points, and the one or more egress points; or
    calculating the proposed path, based on the one or more ingress points, and the one or more egress points.

11. The method of claim 1, further comprising transmitting the message indicative of the proposed path in response to a triggering event, wherein the triggering event comprises:
    a determination that the vehicle is within a threshold distance of the intersection,
    a determination that the vehicle will arrive within the threshold distance of the intersection within a threshold amount of time,
    or both.

12. The method of claim 1, wherein the message indicative of the proposed path comprises an application-layer message as defined by a Society of Automotive Engineers (SAE) Message or by European Telecommunications Standards Institute Intelligent Transport Systems (ET SI-ITS).

13. A device for communicating information for traversal of a vehicle through an intersection, the device comprising:
    a wireless communication interface;
    a memory; and
    one or more processing units communicatively coupled to the memory and the wireless communication interface, wherein the one or more processing units are configured to:

obtain information regarding a geometry of the intersection;

determine a proposed path of the vehicle through the intersection, from a predetermined one of one or more ingress points of the intersection to a predetermined one of one or more egress points of the intersection, based at least in part on:
one or more characteristics of the vehicle,
the geometry of the intersection,
the one or more ingress points, and
the one or more egress points; and wirelessly transmit, via the wireless communication interface, a message indicative of the proposed path, wherein the message includes ingress and egress blocking information indicative of which of the one or more ingress points and which of the one or more egress points will be blocked by the vehicle during a period of time in which the vehicle traverses through the intersection on the proposed path.

14. The device of claim 13, wherein the one or more characteristics of the vehicle comprise:
vehicle size,
vehicle type,
vehicle model,
whether the vehicle is towing a trailer or towed load,
stopping distance,
turning radius,
acceleration, or
deceleration, or
any combination thereof.

15. The device of claim 13, wherein the one or more processing units are further configured to include, in the message:
information indicative of one or more segments of the proposed path; and
for each segment:
a time of arrival of the vehicle at the respective segment, and
a time of departure of the vehicle from the respective segment.

16. The device of claim 15, wherein the one or more processing units are further configured to include, in the ingress and egress blocking information, information for each segment indicative of which of the one or more ingress points and which of the one or more egress points will be blocked by the vehicle between the time of arrival of the vehicle at the respective segment, and the time of departure of the vehicle from the respective segment.

17. The device of claim 15, wherein the one or more processing units are further configured to determine, for each of the one or more segments, a geometry of the respective segment.

18. The device of claim 17, wherein the one or more processing units are configured to determine the geometry for each of the one or more segments based at least in part on:
one or more static characteristics of the vehicle,
one or more dynamic characteristics of the vehicle,
the geometry of the intersection,
one or more temporary characteristics of the intersection,
the predetermined one of the one or more ingress points, or
the predetermined one of the one or more egress points, or
any combination thereof.

19. The device of claim 13, wherein the device comprises a mobile computer system onboard the vehicle.

20. The device of claim 13, wherein the device comprises a Road-Side Unit (RSU).

21. The device of claim 13, wherein, to determining the proposed path, the one or more processing units are configured to:
look up a predetermined path in a database, based on the one or more characteristics of the vehicle, the geometry of the intersection, the one or more ingress points, and the one or more egress points; or
calculate the proposed path, based on the one or more characteristics of the vehicle, the geometry of the intersection, the one or more ingress points, and the one or more egress points.

22. The device of claim 13, wherein:
the one or more processing units are configured to detect a triggering event comprising:
a determination that the vehicle is within a threshold distance of the intersection,
a determination that the vehicle will arrive within a threshold distance of the intersection within a threshold amount of time,
or both; and
the one or more processing units are configured to transmit the message indicative of the proposed path in response to detecting the triggering event.

23. A device for communicating information for traversal of a vehicle through an intersection, the device comprising:
means for obtaining information regarding a geometry of the intersection;
means for determining a proposed path of a vehicle through the intersection, from a predetermined one of one or more ingress points of the intersection to a predetermined one of one or more egress points of the intersection, based at least in part on:
one or more characteristics of the vehicle,
the geometry of the intersection,
the one or more ingress points, and
the one or more egress points; and
means for wirelessly transmitting a message indicative of the proposed path, wherein the message includes ingress and egress blocking information indicative of which of the one or more ingress points and which of the one or more egress points will be blocked by the vehicle during a period of time in which the vehicle traverses through the intersection on the proposed path.

24. The device of claim 23, further comprising means for including, in the message:
information indicative of one or more segments of the proposed path; and
for each segment:
a time of arrival of the vehicle at the respective segment, and
a time of departure of the vehicle from the respective segment.

25. The device of claim 24, further comprising means for including, in the ingress and egress blocking information, information for each segment indicative of which of the one or more ingress points and which of the one or more egress points will be blocked by the vehicle between the time of arrival of the vehicle at the respective segment, and the time of departure of the vehicle from the respective segment.

26. The device of claim 24, further comprising means for determining, for each of the one or more segments, a geometry of the respective segment.

27. A non-transitory, computer-readable medium having instructions stored thereby for communicating information for traversal of a vehicle through an intersection, wherein the instructions, when executed by one or more processing units, cause the one or more processing units to:
- obtain information regarding a geometry of the intersection;
- determine a proposed path of the vehicle through the intersection, from a predetermined one of one or more ingress points of the intersection to a predetermined one of one or more egress points of the intersection, based at least in part on:
  - one or more characteristics of the vehicle,
  - the geometry of the intersection,
  - the one or more ingress points, and
  - the one or more egress points; and
- wirelessly transmit a message indicative of the proposed path, wherein the message includes ingress and egress blocking information indicative of which of the one or more ingress points and which of the one or more egress points will be blocked by the vehicle during a period of time in which the vehicle traverses through the intersection on the proposed path.

* * * * *